United States Patent [19]

Ofek et al.

[11] Patent Number: 5,216,670
[45] Date of Patent: Jun. 1, 1993

[54] MESSAGE STRIPPING PROTOCOL FOR A COMMUNICATION NETWORK

[75] Inventors: Yoram Ofek, Riverdale, N.Y.; Adrian Segall, Haifa, Israel

[73] Assignee: International Business Machines Corporation, Armonk, N.Y.

[21] Appl. No.: 725,718

[22] Filed: Jul. 3, 1991

[51] Int. Cl.$^5$ .......................... H04J 3/24; H04L 12/42
[52] U.S. Cl. ................................. 370/85.14; 370/94.1
[58] Field of Search ..................... 370/85.4, 85.5, 85.9, 370/85.12, 85.14, 85.15, 94.1, 99, 85.13

[56] References Cited

U.S. PATENT DOCUMENTS

| | | | |
|---|---|---|---|
| 4,287,592 | 9/1981 | Paulish | 370/85.14 |
| 4,567,590 | 1/1986 | Bederman | 370/85.15 |
| 4,577,313 | 3/1986 | Sy | 370/85.14 |
| 4,621,362 | 11/1986 | Sy | 370/85.14 |
| 4,672,607 | 6/1987 | Nakayashiki et al. | 370/85.14 |
| 4,769,814 | 9/1988 | Bederman et al. | 370/85.12 |
| 4,932,023 | 6/1990 | Geyer et al. | 370/85.4 |
| 4,941,142 | 7/1990 | Kida | 370/85.4 |
| 5,070,501 | 12/1991 | Shimizu | 370/85.5 |
| 5,142,530 | 8/1992 | Geyer et al. | 370/85.5 |

*Primary Examiner*—Benedict V. Safourek
*Attorney, Agent, or Firm*—Scully, Scott, Murphy & Presser

[57] ABSTRACT

A method of discarding unwanted data packets from a communication network of the type having a multitude of nodes connected together to form a circular network. Each node has an address, and each data packet includes a plurality of address subfields to identify addresses of one or more of said nodes. The method comprises the steps of dividing the network into a plurality of segments such that each of the network segments is adjacent at least another of the network segments, assigning each of the network segments one of a plurality of subspace values such that adjacent network segments have different subspace values, and assigning to each address subfield one of the plurality of subspace values. The method further comprises the step of transmitting each data packet over the communication network; and this transmitting step, in turn, includes the steps of (i) at each node, comparing the subspace value of the network segment in which the node is located, with the subspace value in one of the address subfields in the data packet, (ii) if said compared values are not equal, discarding the said one address subfield, and (iii) discarding the data packet after all of the address subfields therein have been discarded. Also disclosed is a method for addressing data packets for routing over a communication network of the type having a multitude of nodes connected together.

14 Claims, 7 Drawing Sheets

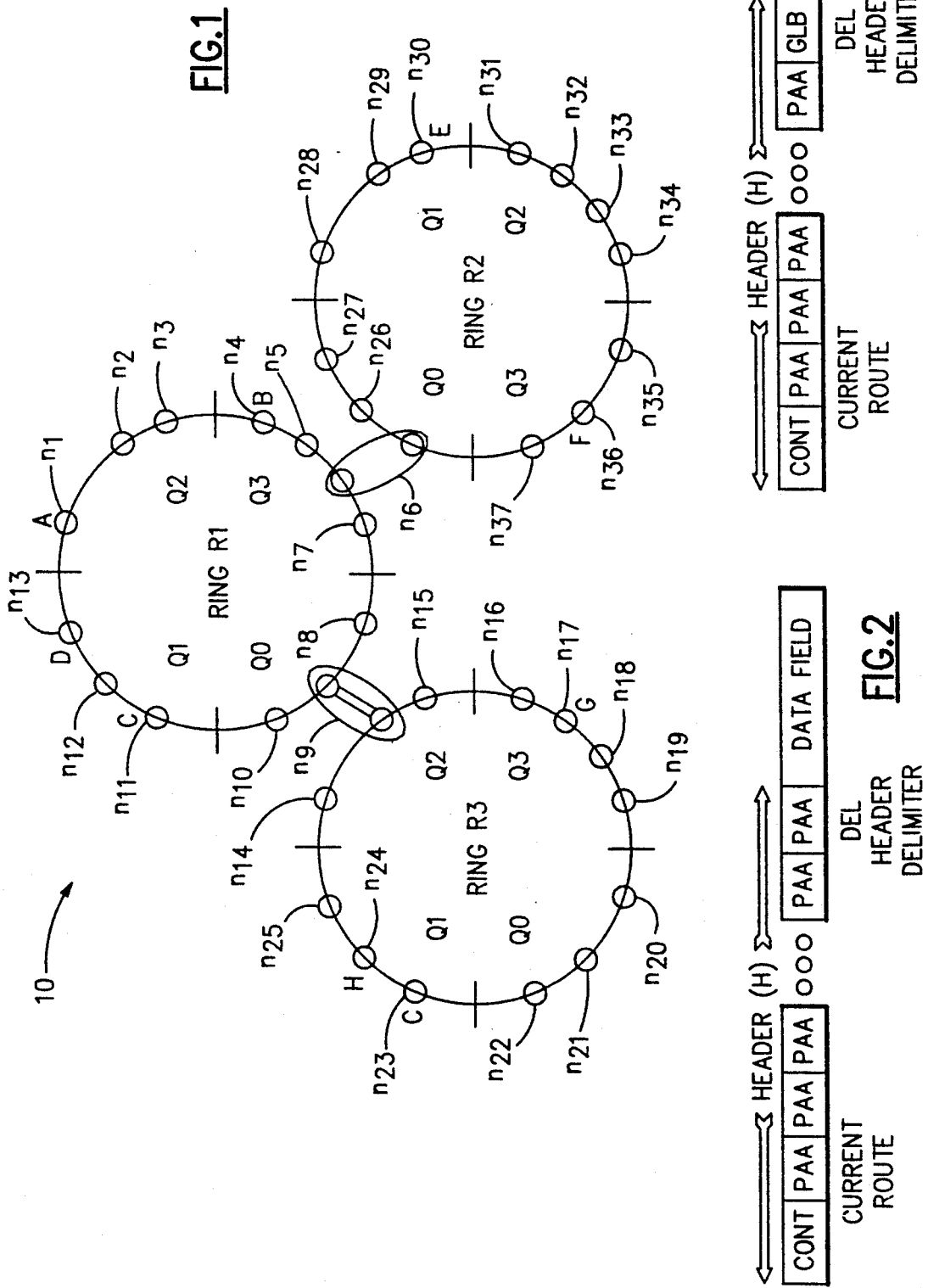

MESSAGE STRIPPING PROTOCOL FOR A COMMUNICATION NETWORK

BACKGROUND OF THE INVENTION

The invention relates to communications networks in general, and more particularly to protocol for stripping data from the networks.

The use of serial or ring communication networks for transferring data is well known in the prior art. Such networks consist of a set of stations serially connected to a communication medium. Information is transferred sequentially, bit by bit, from one station to the next. The inactive stations are bypassed while the active stations regenerate and repeat each bit. Furthermore, the stations are used as the means for attaching one or more devices, such as terminals, work station, computers, and displays, that communicate with other devices on the network.

An originating station transfers its information, or message, onto the ring; and the message circulates, passes one or more intermediate stations, until it arrives at the destination station where it is copied. In some implementations, the destination station strips the message from the ring; and in other implementations, the message remains on the ring until it arrives at the originating station where it is stripped from the ring. Usually, the ring also includes a monitor station that is responsible for stripping messages that have not been stripped by the station normally responsible for the stripping. In addition, the monitor station may perform other types of housekeeping functions for the ring.

An access method protocol is a necessary element for the above described ring network. These protocols are the mechanisms that enable a station to transmit on the ring. Stated another way, an access protocol gives a station the right to place its messages for transmission on the ring. The prior art uses several different types of access method protocols, and the so-called "register" insert access protocol and "token" insert access protocols are representative of the prior art. Whenever the register insert access protocol is used, a station seizes the opportunity to transmit when there is an "idle" signal on the ring. With the token insert access protocol, a station has an opportunity to transmit whenever it receives a token.

Although the prior art access method protocols work well for the intended purpose, they have certain disadvantages that tend to reduce the overall efficiency of the ring networks. For example, the register insert protocols require the introduction of relatively long delays in the ring in order that expendable messages can be successfully stripped from the ring, and these delays lengthen the time that is needed to process a message. Likewise, the token access protocol allows only one message to be on the ring at any particular instant of time; and when the messages are relatively short, compared to the latency of the ring, only a fraction of the available ring bandwidth is used. Failure to use all of the available ring bandwidth reduced the efficiency of the ring because a series of idle patterns must be transmitted to fill up the vacancy on the ring.

Another requirement for the above-described communication networks is that message fragments and exhausted or expendable messages must be removed or stripped from the ring. The message stripping can take place at some time after the message has reached its destination node. Stripping generally involves either replacing the stripped message with a new message or else replacing the old message with idle patterns. On a register-insertion ring it is desirable to begin stripping early, since this tends to recover a portion of the ring's bandwidth for reuse by another transmitting station.

A station must be able to distinguish between messages that require stripping actions by this station and those messages which require stripping actions by another station. In order to make this distinction, some serial buffering of a message may be required, and it is desirable to keep such buffering to a minimum in order to reduce costs and to reduce added ring latency.

The prior art uses different types of stripping protocols to dispose of exhausted messages and/or fragments. One stripping protocol requires the target station to strip each message that it receives. This approach recovers bandwidth promptly; however, this approach is unsuitable for broadcast messages, destined for multiple target nodes. Also, this approach does not provide feedback to the original sending station.

Another stripping protocol requires that the sending station strips each message which it has sent, after this message comes back around the ring. This approach is suitable when the access protocol is such that no messages originated by another station can arrive, at the sending station, prior to the return of any messages which this sending station has originated. This approach can also be used if the sending station is designed so as to insert sufficient buffer delay into the ring such that the sending station can examine the source address of an arriving message, and then determine whether this arriving message should be stripped, or else should be permitted to continue on its way around the ring. Since the location of the source address field may occur many bytes after the start delimiter field, this approach adds undesirable delay to the ring and also requires the addition of costly buffering facilities for each station.

SUMMARY OF THE INVENTION

An object of this invention is to improve methods for removing data packets from communication networks.

Another object of the present invention is to ensure that a data packet is removed from a communication network even if there is a failure by the node principally responsible for removing the data packet.

A further object of this invention is to obtain seamless routing of a data packet between rings of a multi-ring communication network.

A still further object of the present invention is to improve procedures for identifying a route for a data packet over a communication network.

These and other objectives are obtained with a method of discarding unwanted data packets from a communication network of the type having a multitude of nodes connected together to form a circular network. Each node has an address, and each data packet includes a plurality of address subfields to identify addresses of one or more of said nodes. The method comprises the steps of dividing the network into a plurality of segments such that each of the network segments is adjacent at least another of the network segments, assigning each of the network segments one of a plurality of subspace values such that adjacent network segments have different subspace values, and assigning to each address subfield one of the plurality of subspace values. The method further comprises the step of transmitting each data packet over the communication network; and this transmitting step, in turn, includes the steps of (i) at each node, comparing the subspace value of the network segment in which the node is located, with the subspace value in one of the address subfields in the data packet, (ii) if said compared values are not equal, discarding the said one address subfield, and (iii) discarding the data packet after all of the address subfields therein have been discarded.

This invention also relates to a method for addressing data packets for routing over a communication network of the type having a multitude of nodes connected together. This method comprises the steps of separating the network into a plurality of segments such that each of the segments is adjacent to at least one of the other of the segments, assigning each of the segments one of a plurality of subspace values such that adjacent segments have different subspace values, and providing the data packet with an address field to identify a route for the data packet between a first and a second of the nodes. This providing step includes the step of establishing a respective one associated subfield in the address field for each segment of the network in said route, and arranging these subfields in a sequence in the address field. Each subfield includes a subspace component and an address component. The providing step further includes the steps of alternating the subspace components of the subfields in said sequence between said plurality of subspace values; and for the ring segment in said route that includes said second node, establishing the address of the second node as the address component of the subfield associated with the ring segment.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 1 illustrates a communication network employing the present invention.

FIG. 2 shows a data packet that may be transmitted over the network of FIG. 1.

FIG. 10 shows a data packet addressed to a global address.

DETAILED DESCRIPTION OF THE PREFERRED EMBODIMENTS

Figure 3:
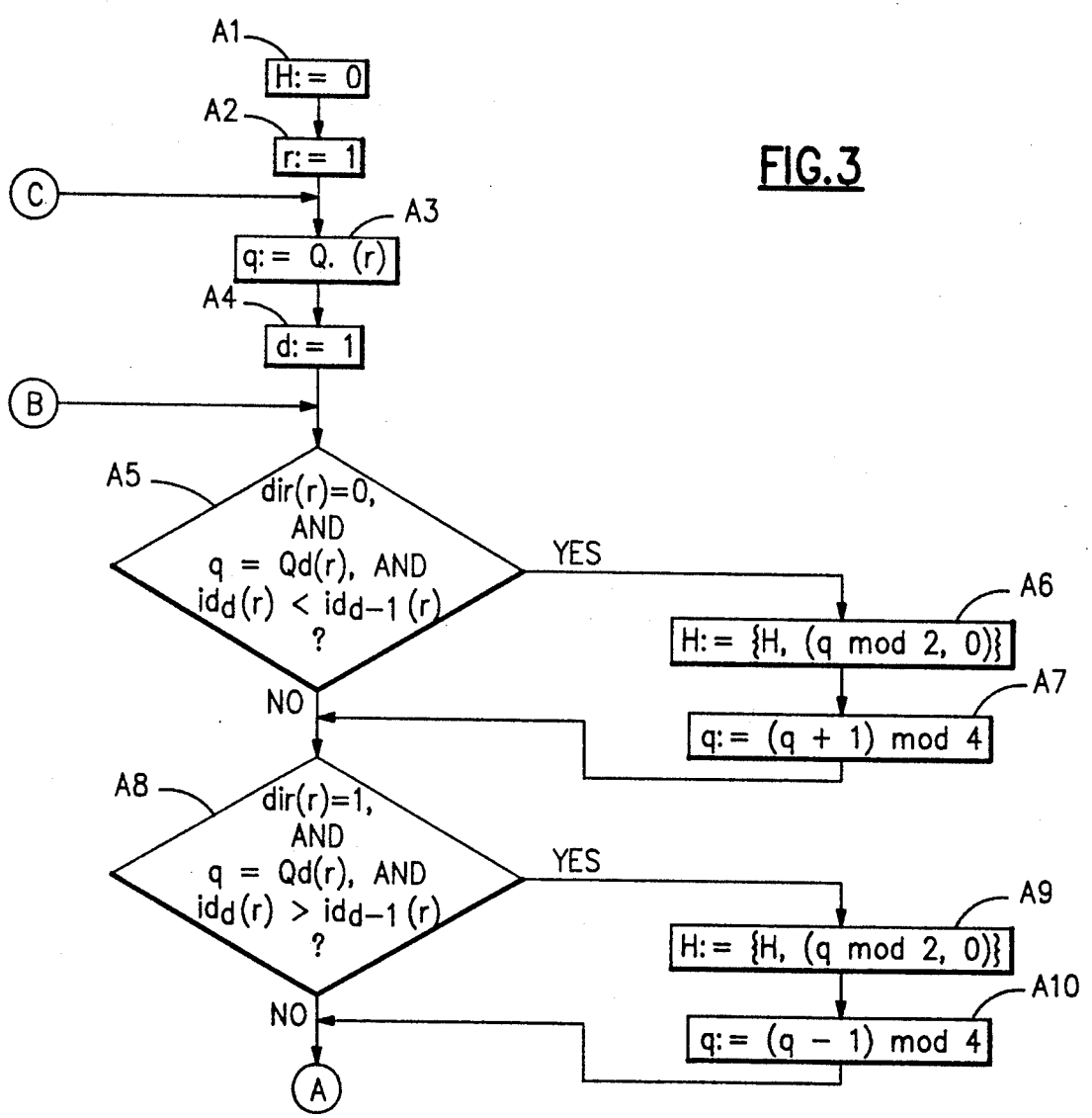
FIGS. 3 and 4 illustrate a procedure for establishing the header of a data packet.

FIG. 1 shows communication system or network 10, comprising of a plurality of interconnected rings R1, R2, and R3. Each ring, in turn, includes a multitude of nodes, and the nodes of each ring are interconnected by a uni-directional or bi-directional transmission medium to form a closed loop, serial ring communication network. In FIG. 1, the nodes are referenced as $n_1$–$n_{37}$, and selected nodes are also identified by various capital letter, such as A through H. The nodes of network 10 include two types: bridge nodes, which are the nodes that connect together two rings; and non-bridge nodes, which are all of the nodes other than the bridge nodes. In particular, nodes $n_6$ and $n_9$ are bridge nodes, and all of the other nodes are non-bridge nodes.

Rings R1, R2, and R3 are used to interconnect a multitude of data terminal equipment or units (not shown). Each data terminal unit may include one or several devices such as display terminals, micro computers, data collectors, word processing units, or telephone apparatus. The function of system 10 is to exchange or distribute data between those devices, and each data terminal device is connected to one of the rings by a non-bridge node. The structures and functions of the non-bridge nodes are substantially identical, and basically the purpose of these nodes is to receive data from and to transmit data onto rings R1, R2, and R3 without impacting the design of the data terminal equipment. Each non-bridge node and its connected data terminal equipment are, collectively, often referred to as a station.

In addition, communication system 10 is preferably reconfigurable in that if a station or node becomes inoperable, the rest of the system may continue to operate. This reconfigurability is achieved by bypassing any defective station or node, or even any defective ring segment, so that the functional station still have the opportunity to operate.

In accordance with the present invention, each direction of each ring of network 10 is partitioned into an even number, such as 2, 4, 6, 8, or 10, of ring or bus segments, referred to as ring subspaces; and each ring subspace has one of two bit values assigned to it such that adjacent ring subspaces have different bit values assigned to them. For instance, if a particular ring is divided into two subspaces, the first subspace may have a bit value of 1 assigned to it, and the second subspace may have a bit value of 0 assigned to it. In the embodiment of network 10 shown in FIG. 1, each ring is divided into four segments or quarters, referenced at Q0, Q1, Q2, and Q3; and the first and third quarters of each ring are assigned one of the two bit values, while the second and fourth quarters of each ring are assigned the other of the two bit values. Even more specifically, for example, the first and third quarters of each ring may have a subspace bit value of 1, and the second and fourth quarters of each ring may have a subspace bit value of 0.

In addition, each node is provided with a value referred to as a physical access address (PAA) comprised of two components: a first component, which is set equal to the subspace bit value of the ring subspace in which the node is located, and a second component, which is used as a node identification or address. For instance, the PAA of each node may be an 8-bit string or value, with the first, or most significant, bit of this being the ring subspace bit component, and the remaining seven bits being the node identification.

As previously mentioned, data may be transmitted in either direction around each ring of network 10; and for the sake of simplicity, preferably each node of each ring has the same PAA regardless of the specific direction data is transmitted to the node over the ring. Further, within each subspace of each ring, each node has a unique PAA. However, each node may have more than one PAA, and a group of nodes may share the same PAA.

As discussed below in greater detail, three possible node identification values are used for specific instructions, and thus these three values are not available as node addresses. All other possible node addresses can be assigned to nodes in a given segment or subspace of a given ring. Hence, in a ring having four segments and where seven bit address values are used, up to $128-3=125$ different node addresses can be used in any ring segment, and up to 500 node addresses can be used in any ring. The number of possible node addresses in a given ring can be easily increased by dividing the ring into 6 or 8 subspaces instead of four.

As mentioned above, the rings of network 10 are connected to one another by bridge nodes, and each side of a bridge node can have a different PAA. Preferably, the routing of data via the bridge nodes is seamless—that is, it is the same as the routing of data over a single ring. Also, the bridge nodes are not destination nodes for data packets, but function merely as switches to transmit the data packets between the rings. Consequently, when a bridge node receives a data packet over a first ring, that node only needs to determine whether the data packet should be deleted, continued on that first ring, transmitted to a second ring, or both continued on that first ring and transmitted to the second ring.

With reference to FIG. 2, a data packet is divided into two, variable length parts: a header (H); and a data field. The header of each data packet includes a control field located at the beginning of the header, and an address field that follows the control field; and the address field of each header, in turn, includes a plurality of address subfields, each of which is capable of holding one PAA.

The control field of the header is used to indicate whether the data packet is addressed to a list of different addresses, or to one, group address. The former type of data packet is referred to as a point-to-list packet, while the latter type of data packet is referred to as a group data packet. These two types of data packets have different identifiers in their respective control fields; and for instance, the identifier for the point-to-list packet may be represented as PTL, and the identifier for the group data packet may be represented as GR.

Each address subfield of a header is preferably an 8-bit string; and when a PAA is placed in an address subfield, the ring subspace bit of the PAA is placed in the first, or most significant, bit of the subfield, and the node address or identification value in the PAA is placed in the next seven bits of the subfield.

As mentioned above, three possible node address values are used for specific purposes. These values, which preferably are seven bit values, are referred to as, $\phi$, RDEL, and DEL; and when they are used, they are located in an address subfield of the address field of the header, and in particular, in the last seven bits of that subfield. As discussed in greater detail below, $\phi$ is used simply to cause a data packet to be transmitted across a ring node without being copied by that node. DEL, referred to as the header delimiter, is located at the end of the address field of a header; and if this delimiter becomes the front subfield in that field, the data packet should be discarded.

RDEL, referred to as the ring delimiter, is used to indicate to a bridge node that a data packet is to be transmitted from one ring to another ring. To elaborate, when a bridge node, which connects together first and second rings, identifies its own address in the header of a data packet received by the bridge node over the first ring, then, if the next address subfield of the header contains RDEL, the bridge node transmits the data packet to the second ring. The first bit of an address subfield that contains RDEL determines the direction in which the data packet is to be transmitted over that second ring, and thus this first bit is referred to as the direction bit. For example, that packet may be routed in clockwise and counter-clockwise directions on that adjacent ring if the direction bit is 0 and 1, respectively. Further, as explained in greater detail below, RDEL is also used to discard packets in the case of bridge failure; and in particular, if this value becomes the front subfield in the address field of the header of a packet, the data packet should be discarded.

Generally, the first bit in an address subfield that does not contain RDEL or DEL, is called the subspace bit; and more specifically, in the preferred embodiment of the invention described herein in detail, because each ring is divided into four quarters, that subspace bit is called the quarter bit. Also, regardless of whether an address subfield contains a node address, $\phi$, RDEL or DEL, the first bit of the address subfield is represented herein by the symbol "z'", and the remaining bits of the subfield are represented by the symbol "id'".

The routing technique employed on network 10 is of the general type known as source-routing, in which all of the necessary routing information is in the header of the data packet when that data packet leaves its source node, and the selected transmission route of the data packet is fixed. More specifically, the present invention may be embodied in two different types of routing techniques, referred to as point-to-list routing and group routing, respectively. In the point-to-list routing mode, each node that is to copy the data packet is individually listed in the header of the data packet. In the group routing mode, a group node address is located in the header and the data packet is copied by each node having that group address.

In addition, the data packet routing technique of this invention employs the following general principles. First, at each node, the decision of what to do with a received data packet is made according to the data in the address subfield at the front of the string or sequence of address subfields in the address field of the header. Second, when a data packet leaves its originating node, the value of the ring subspace bit in the first PAA in the header of the data packet should be the same as the value of the ring subspace bit of the ring segment having that originating node. Hence, for example, if a data packet originates from a node located in a ring segment having a subspace bit equal to one, then when that data packet leaves its originating node, the ring subspace bit of the first PAA in the header of the packet should also be equal to one. Analogously, if a data packet originates from a node located in a ring segment having a subspace bit of 0, then when that data packet leaves that node, the ring subspace bit of the first PAA in the header of the data packet should also be 0.

In the point-to-list routing mode, a data packet is sent from a source to a list of destinations on a ring or a multi-ring configuration. In this mode, the source node determines two things: (i) the route in which the packet will travel, and (ii) which nodes across this route should copy the data packet. The destination nodes are embedded in the transmission route in the order in which they are traversed by the data packet. If a node identifies its address in the front address subfield of the header of a data packet, the node copies the data packet, and then this address subfield is discarded or deleted from the header, and the next subsequent address subfield becomes the new front address subfield in the header. The data packet itself will be removed from the ring when the address subfield containing DEL becomes the front address subfield in the header of the data packet.

Generally, the route a data packet takes is determined by the z' values in the PAAs in the header of the data packet and by the use of the $\phi$ value. For example, assume that each ring is divided into four quarters, Q0, Q1, Q2, and Q3, as shown in FIG. 1. In this case, the subspace bit, z', of each ring segment is given by the equation z'=Q mod 2, where Q=0, 1, 2, and 3 for the ring quarters Q0, Q1, Q2, and Q3, respectively. Thus, for instance, in the second quarter, z'=0, and in the third quarter, z'1. Consequently, to send a data packet clockwise from node A in ring R1 to node B, which is in the third quarter of ring R1, the data packet is provided with the following header:

$H=\{PTL, (0,\phi), (1,B), DEL\}$ where B is the address of node B. To send this data packet counterclockwise from node A to node B the following header is used:

$H=\{PTL, (0,\phi), (1,\phi), (0,\phi), (1,B), DEL\}$

When a data packet is to be copied by a plurality of nodes, the addresses of those nodes are listed in the header of the data packet in the order in which those nodes are traversed by the data packet. Also, for each ring subspace having one or more nodes that are to copy the data packet, except for the last such ring subspace, the value (z',$\phi$) is added to the header after the address of the last node in the ring subspace that is to copy the data packet. For example, to send a data packet from node B in the third quarter of ring R1 to nodes C and D in the first quarter of that ring, and to node A in the second quarter of ring R1, the data packet is provided with the following header:

$H=\{PTL, (1,\phi), (0,\phi), (1,C), (1,D), (1,\phi), (0,A), DEL\}$ where C, D, and A, are the addresses of nodes C, D, and A, respectively. The header delimiter DEL is always placed after the address of the last node on the list.

As previously mentioned, bridges are switches that connect two rings, and each bridge has an address in each of the two rings connected by the bridge. In general, for a bridge between rings i and j, the address of the bridge on ring i is represented by the symbol B(i,j), and the address of the bridge on ring j is represented by the symbol B(j,i). More specifically, for instance, for the bridge between rings R1 and R2 in FIG. 1, the address of the bridge on ring R1 is B(1,2), and the address of the bridge on ring R2 is B(2,1).

As mentioned above, a bridge address is always followed by the ring delimiter RDEL. When a bridge node, which connects together first and second rings, recognizes its own address in the header of a data packet transmitted to that bridge over the first ring, and that address is followed by the ring delimiter, then the bridge node removes the data packet from the first ring and transmits it onto the second ring. The direction of travel of the data packet on that second ring is determined by the first, or most significant, bit of the address subfield having the ring delimiter. For example, if a data packet is to be sent clockwise from node A on ring R1 to the bridge node connecting rings R1 and R2, and then counterclockwise on ring R2 to node E, then the data packet is provided with the following header:

$H=\{PTL, (0,\phi) (1,B(1,2)), (0,RDEL), (0,\phi), (1,E), DEL\}$

Figure 4:
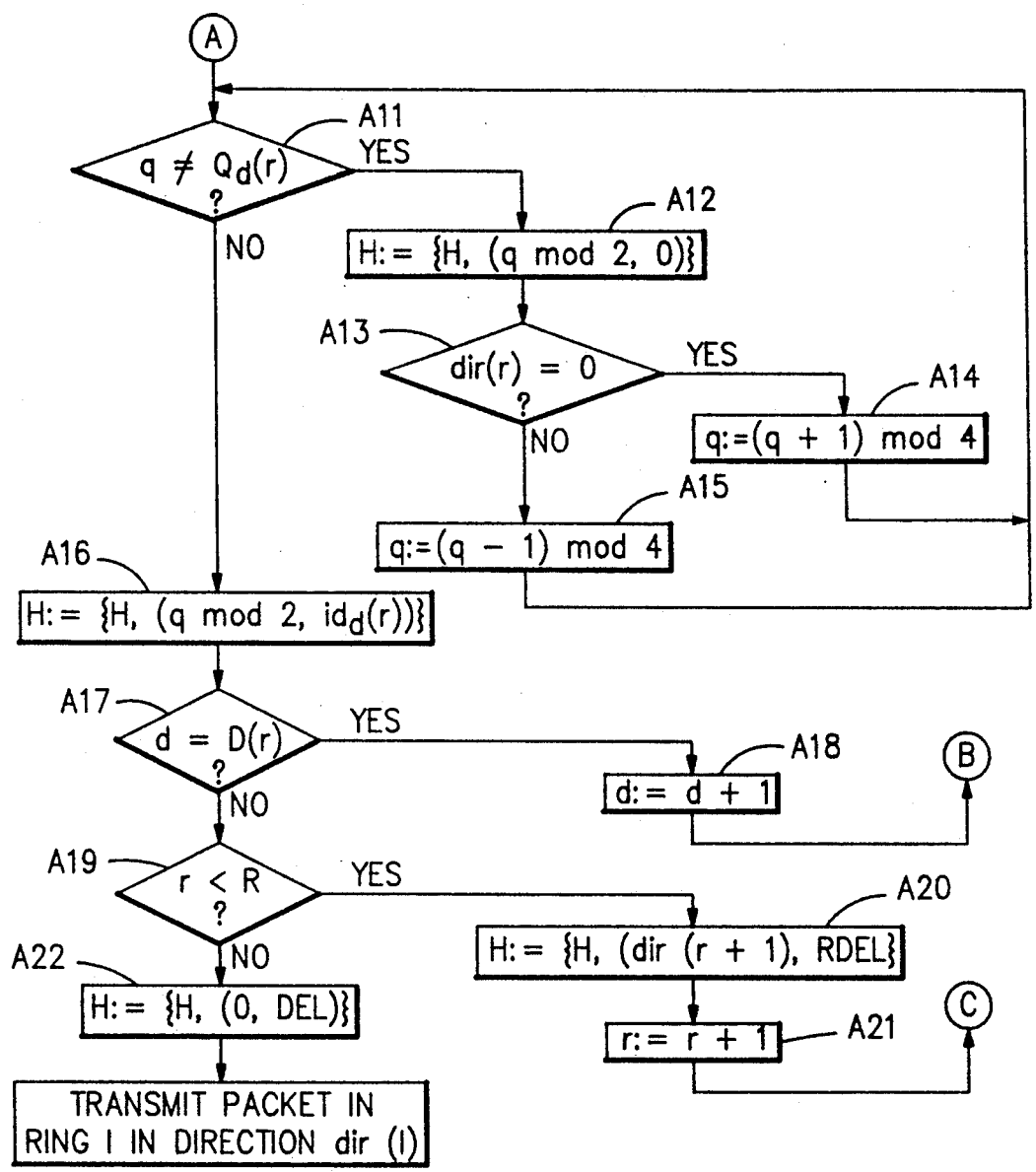

FIGS. 3 and 4 illustrate a flow chart employed by a source node to establish the header for a data packet. This flow chart uses the following notation:

H represents the Header,
$\phi$ is an address that does not match any existing address,
DEL is the final delimiter of the header,
RDEL is an inter-ring delimiter,
R is the number of rings over which the data packet is to be transmitted,
D(r) is the total number of destination nodes plus the number of bridge nodes, if any, in ring r,
dir(r) represents the direction in which the data packet is to be transmitted in ring r,
$Q_d(r)$ is the quarter in ring r in which the d-th destination in that ring is located,
$Q_o(r)$ is the quarter in ring r in which the node source or the bridge node is located, and
$id_d(r)$ is the address or the identity value of the d-th destination node in $Q_d(r)$.

The various steps in the algorithm of FIGS. 3 and 4 are identified as A1-A23. Step A1 in this algorithm is to set H equal to the null set, $\phi$; and at steps A2, A3, and A4, three internal variable represented by r, q, and d are set equal to 1, $Q_o(r)$ and 1 respectively. After step A4, a loop is begun, and this loop is repeated for each value of d from 1 to D(r). In particular, at step A5, a first decision is made. If dir(r) equals 0, and q equals $Q_d(r)$ and $id_d(r)$ is before $id_{d-1}(r)$, then the algorithm proceeds to steps A6 and A7. At step A6, H is set to a new value; and specifically, a new PAA is added to the current header. The first bit in this new PAA value is equal to q mod 2, and the last seven bits in this new PAA value are set equal to $\phi$. At step A7, q is set to a new value according to the equation: q=(q+1) mod 4; and after step A7, the algorithm continues to step A8.

If, at step A8, dir(r) equal 1, and q equals $Q_d(r)$ and $id_d(r)$ is after $id_{d-1}(r)$, then the algorithm proceeds to steps A9 and A10. At step A9, a PAA value is added to the end of the current string of subaddress fields in the header; and the first bit in this new PAA value is equal to q mod 2, and the last seven bits in this new PAA value are set equal to $\phi$. At step A10, q is set equal to (q−1) mod 4, and then the algorithm continues to step A11.

At step A11, q is compared to $Q_d(r)$; and if these two values are not equal, the algorithm proceeds to step A12. At this latter step, a new PAA is added to H. The first bit in this new PAA value is equal to q mod 2, and the last seven bits of this new address are set equal to $\phi$. After step A12, dir(r) is compared to 0 at step A13. If dir(r) is equal to 0, then, at step A14, q is set to a new value equal to (q+1) mod 4; however, if dir(r) is not equal to 0, then, at step A15, q is set to a new value equal to (q−1) mod 4. After step A14 or A15, the algorithm returns to step A11, with the new value of q.

If, at step A11, q is equal to $Q_d(r)$, then the algorithm skips to step A16, at which a new address is added to H. The first bit in this subfield is equal to (q mod 2), and the last seven bits in this subfield are set equal to the address of the d-th destination node in ring r. Then, at step A17, d is compared to D(r). When d is less than D(r), more destination addresses need to be added to the header; and d is increased by one at step A18, and then the algorithm returns to step A5. Steps A5–A17 are repeated to add one destination node address, and the appropriate number of $\phi$ values, to the header for each node that is to receive the data packet.

Once all of the appropriate addresses and intermediate $\phi$ subfields have been added to the header for each destination node in a given ring, then, at step A17, d equals D(r), and the algorithm moves on to step A19. At this step, the algorithm checks to determine if the appropriate number of addresses have been added to the header for all of the destination nodes on all of the rings to which the data packet will be transmitted, and this is done by comparing r to R. If r is less than R —which means that node addresses on addition rings need to be added to the header— then the ring delimiter is added to the current end of the header, at step A20, r is increased by one at step A21, and the algorithm returns to step A3 However, if at step A19, r equals R —which means that all of the appropriate PAA's have been added to the header— then the header delimiter is added at step A22, and the packet is transmitted over ring 1 in direction dir(1).

Figure 5:
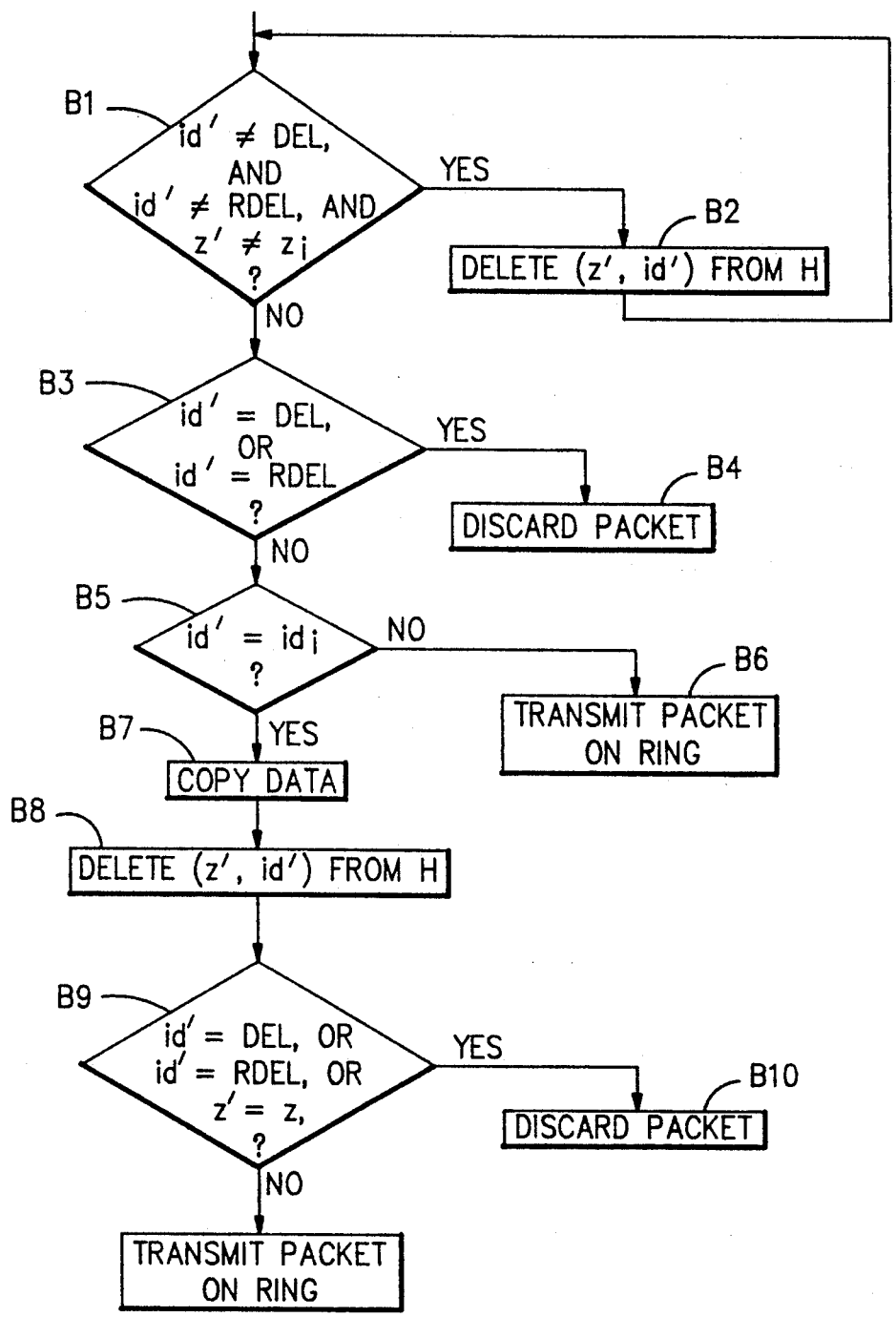
FIG. 5 is a flow chart showing a procedure employed by non-bridge nodes of the communication network to determine what to do with a received data packet.

FIG. 5 is a flow chart showing an algorithm used by a non-bridge node i that receives a data packet to determine if that node should transmit or discard the data packet. This flow chart uses various symbols discussed above, and also uses the following notation:

z' represents the first bit in the front PAA in the header of the data packet, and id' represents the last seven bits in the front PAA in the header of the data packet.

The various steps in the algorithm of FIG. 5 are identified as B1–B10. Step B1 is to make a first decision. If the front most address in the address field in the header is neither DEL nor RDEL, and the subspace bit in the front address field of the header is not equal to the subspace bit of node i, then the algorithm proceeds to step B2, which is to delete the first PAA from the address field of the header. Steps B1 and B2 are repeated until one of the conditions tested in step B1 is true. When this happens, the algorithm moves on to step B3, which is to make a second decision; and in particular, the current front most address subfield in the header is checked to see if it is either DEL or RDEL. If that subfield is one of these two delimiters, then the data packet is discarded, at step B4.

If, though, at step B3, the front most address subfield is neither DEL nor RDEL, the algorithm moves to step B5, which is to compare the node address in the front address subfield of the header to the address of node i. If these two addresses are not equal, then at step B6 the data packet is transmitted over the ring in which the node is located. However, if at step B5, the two compared addresses are the same, then node i copies the data packet, at step B7, and deletes the front address subfield from the address field of the header, at step B8. Then the algorithm moves on to step B9. At this step, the address now in the front of the sequence of addresses in the address field of the header is checked to see if it contains DEL, RDEL, or if the subspace bit in that front subfield is equal to z'. If any one of these conditions is true, the data packet is discarded at step B10; but if none of these tested conditions is true, the data packet is transmitted over the ring in which node i is located.

Figure 6:
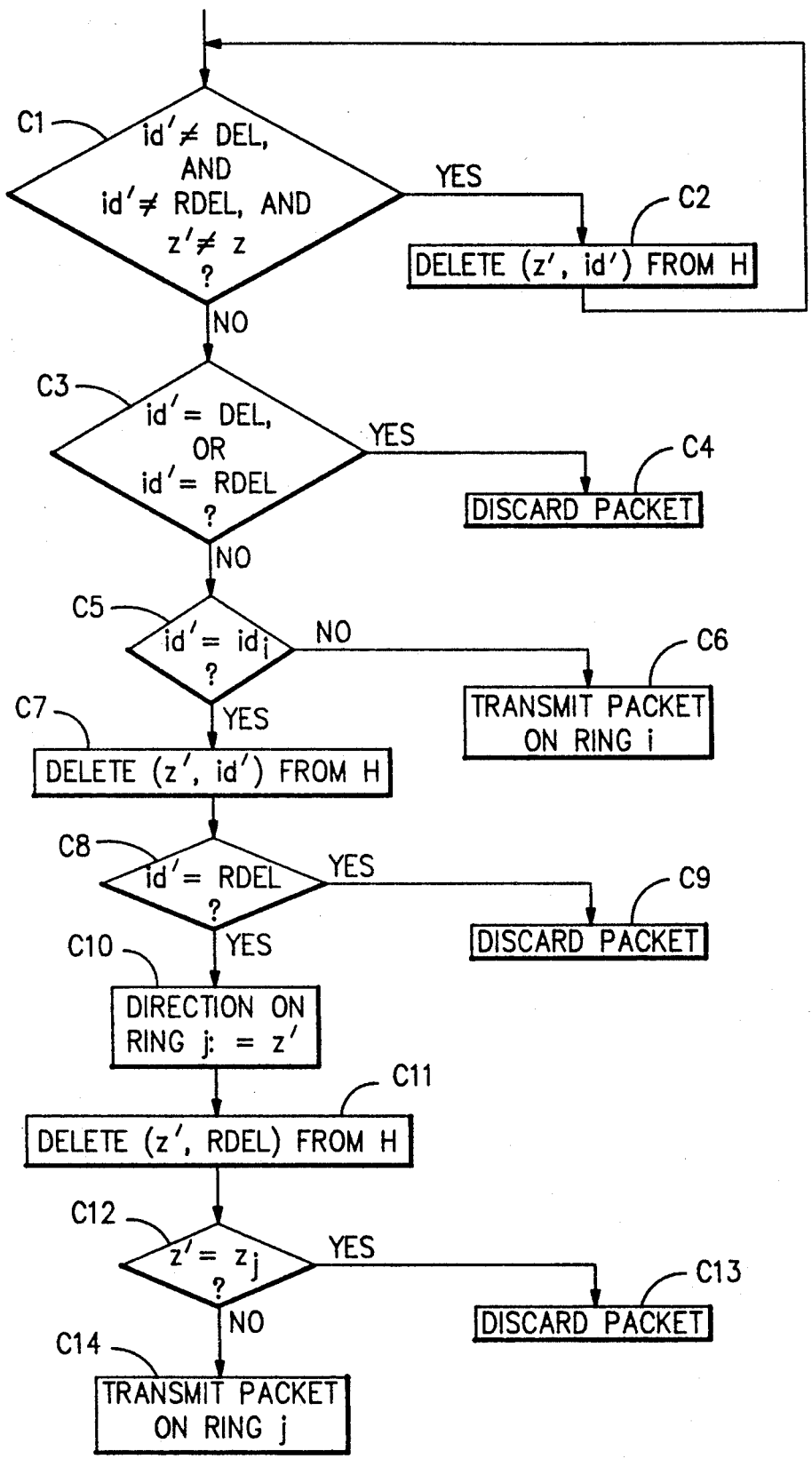
FIG. 6 is a flow chart showing a procedure employed by bridge nodes of the communication network to determine what to do with a data packet.

FIG. 6 is a flow chart illustrating an algorithm used by a bridge node (i,j) after receiving a data packet over ring i. The various steps in this algorithm are identified as C1–C14, and the first six steps of this algorithm are the same as the first six steps of the algorithm of FIG. 5. Specifically, at step C1, if the front address subfield in the header is neither DEL nor RDEL and the front subspace bit is not the subspace bit of node (i,j) in ring i, then the algorithm proceeds to step C2, and the front node address and front subspace bit are removed from the header. Steps C1 and C2 are repeated until one of the conditions tested in step C1 becomes true; and when this happens, the algorithm moves on to step C3. At step C3, another decision is made, and in particular, the new front address subfield in the header is tested to determine if it is either DEL or RDEL. If this new front subfield contains either of these two delimiters, the packet is discarded at step C4; however, if the front address subfield contains neither of these two delimiters, the algorithm moves on to step C5, where a third decision is made.

This third decision is simply to determine if the front most address in the address field of the header is the address of node (i,j). If these two addresses do not match, the data packet is transmitted over ring i, at step C6. However, if at step C5, these two addresses match, the node (i,j) then deletes the front address subfield from the header, at step C7. Then, at step C8, the new front address subfield in the header is checked to determine if it includes RDEL. If that delimiter is not present, then the data packet is discarded at step C9. However, if the delimiter is present, then the direction in which the data packet is to be transmitted over ring j is determined, at step C10, by the z' bit of that front address subfield; and then that front address subfield is deleted from the header at step C11. Next, at step C12, the z' bit of the address subfield now at the front of the address field of the header is compared to the subspace bit of the bridge node in ring j. If these two bit values are not equal, then the data packet is discarded at step C13; however, if these two bit values are not equal, then the data packet is transmitted over ring j at step C14.

As previously mentioned, this invention may also be used to address and route a data packet to a group of destination nodes, and to remove such a packet from a communication network after the packet has been transmitted to all of its destination nodes. Such data packets are referred to as group packets, and the control symbol for the headers of these data packets if GR. In contrast to the point-to-list data packets, the headers of all groups packets have the same structure. In a ring that is divided into four quarters, for example, there may be up to four nodes with the group address $id_G$.

Generally, in order that the group data packet is copied exactly once by each node having the group address but not copied by the source node, the first address but not copied by the source node, the first address subfield in the header of the group data packet is (q,$\phi$), where q is the subspace bit, z', of the ring segment having the source node. As a result, the data packet will initially partially traverse the ring segment in which the data packet was originated, and then will traverse in full over all ring segments, including the one having the source node, having nodes having the group address.

In order to insure that the source node, $id_o$, will not copy its own group data packet, the last address subfield in the address field of the packet header before the header delimiter is provided with a unique address of the source node $(q, id_o)$; and each node, before copying a group data packet, tests the address subfield that is the second subfield from the front of the address field in the header. If this second from the front subfield is not the unique address of the node, the node may copy the data packet; however, if this second subfield contains the unique address of the node, the data packet will not be copied. This feature is particularly important when routing group data packets across bridges.

Thus, for multi-ring networks, all group data packets will have headers with the following format:

$$H = \{GR, (\bar{q}, \phi), (q, id_G), (q, id_G), (q, id_G), (\bar{q}, id_G), (q, id_o), DEL\}$$

and for single ring networks, all group packets will have headers with the following format:

$$H = \{GR, (q, \phi), (\bar{q}, id_G), (q, id_G), (\bar{q}, id_G), (q, id_G), DEL\}$$

When a group packet reaches a bridge node $B(i, j)$ having the group address, that bridge node forwards the data packets on both of the two rings that the bridge connects; that is, the data packet is duplicated. The packet that is routed across the bridge node, from a first ring to a second ring, is viewed on that second ring as if the bridge node is the source node of the data packet. Therefore, when the data packet is being transmitted over the second ring, the format of the header in the data packet will be:

$$H = \{GR, (q, \phi), (\bar{q}, id_G), (q, id_G), (\bar{q}, id_G), (q, id_G), (q, B(j,i)), DEL\}$$

where $B(j,i)$ is the unique address of the bridge node on the second ring. It should be noted that the data packet can be forwarded in either direction, clockwise or counterclockwise, on that second ring.

Figure 7:
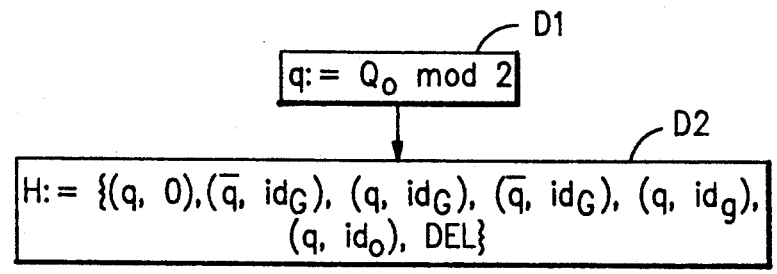
FIG. 7 illustrates a procedure to establish the header of a data packet that is to be transmitted to a group of nodes having a common address.

FIG. 7 is a flow chart illustrating an algorithm for providing the address field of a header of a data packet that is to be transmitted to a group of nodes having the same group address, $id_g$. The first step D1 in this algorithm is to set $z$ equal to $Q_o(r)$ mod 2. Step D2 is to form the address field. The first address subfield is filled with the value $(q,\phi)$. The header is then provided with a respective one address $id_g$ for each node that is to copy the data packet; and the subspace bits of the subfields having this group address alternate between $q$ and $\bar{q}$. After the last group address is added to the address field, that field is provided with the data $(q,id_o)$ where $id_o$ is the address of the source node, and then the delimiter DEL is added.

Figure 8:
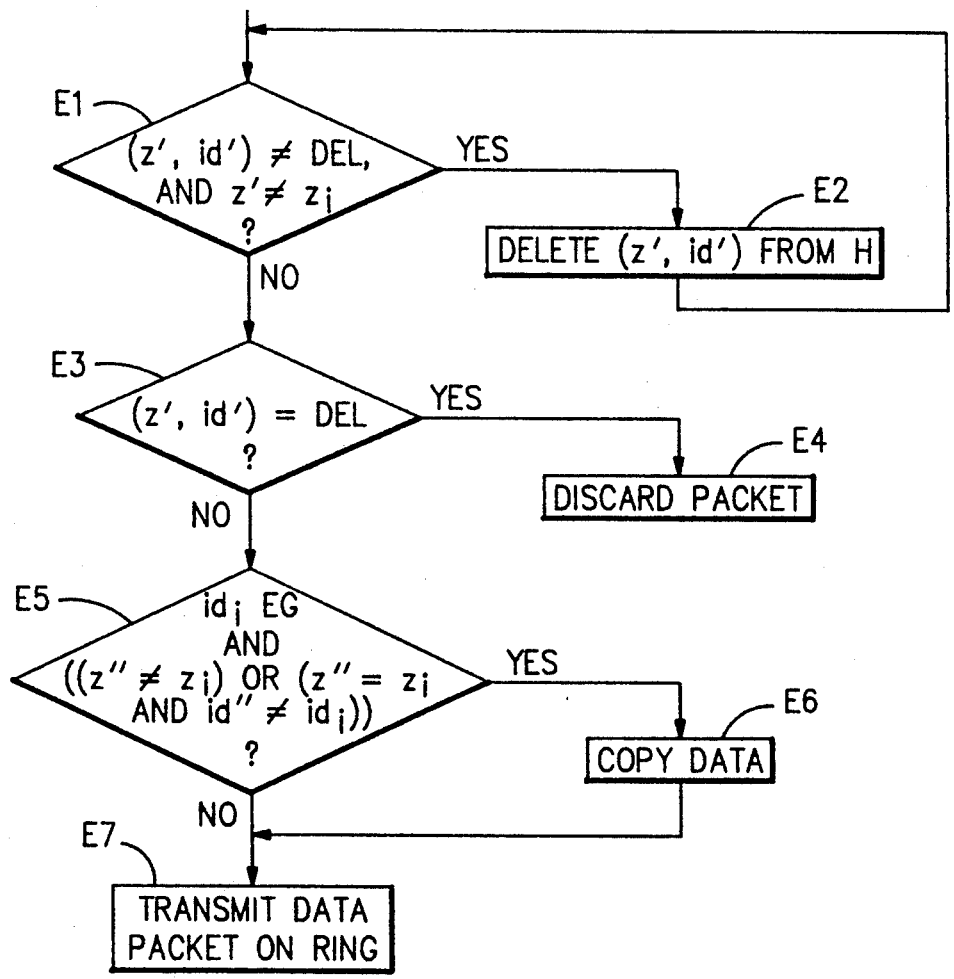
FIG. 8 shows a procedure employed by non-bridge nodes to determine what to do with a data packet having a header provided according to the flow chart shown in FIG. 7.

FIG. 8 is a flow chart illustrating an algorithm used by a non-bridge node i after receiving a data packet. At step E1, a first decision is made. If the first address subfield in the header is not DEL, and the first subspace bit in that first subfield is not the subspace bit of node i, then the algorithm proceeds to step E2, which is to delete that first subfield from the address field of the header.

Steps E1 and E2 are repeated until one of the two conditions tested in step E1 is true. When this happens, the algorithm moves to step E3, which is to determine if the current, front address subfield in the header is the delimiter DEL. If that delimiter is present in the subfield, then the data packet is discarded at step E4; but if the delimiter is not present in the subfield, the algorithm moves on to step E5.

At step E5, two conditions are tested. The first condition is whether node i is one of the nodes for which the data packet is intended, and this is determined by comparing the group address in the header of the data packet to the address of node i. The second condition involves (i) comparing the subspace bit of node i to the subspace bit in the second address subfield in the sequence of subfields in the header, and (ii) comparing the address of node i to the node address in that second subfield. If these two subspace bits are not equal, or if they are equal but these two node addresses are not equal, then this second condition is considered to be true. If both of the conditions tested at step E5 are true, then the node copies the data packet at step E6, and the data packet is then transmitted at step E7. If one of the conditions tested at step E5 is not true, the algorithm skips step E6 and transmits the data packets at step E7.

Figure 9:
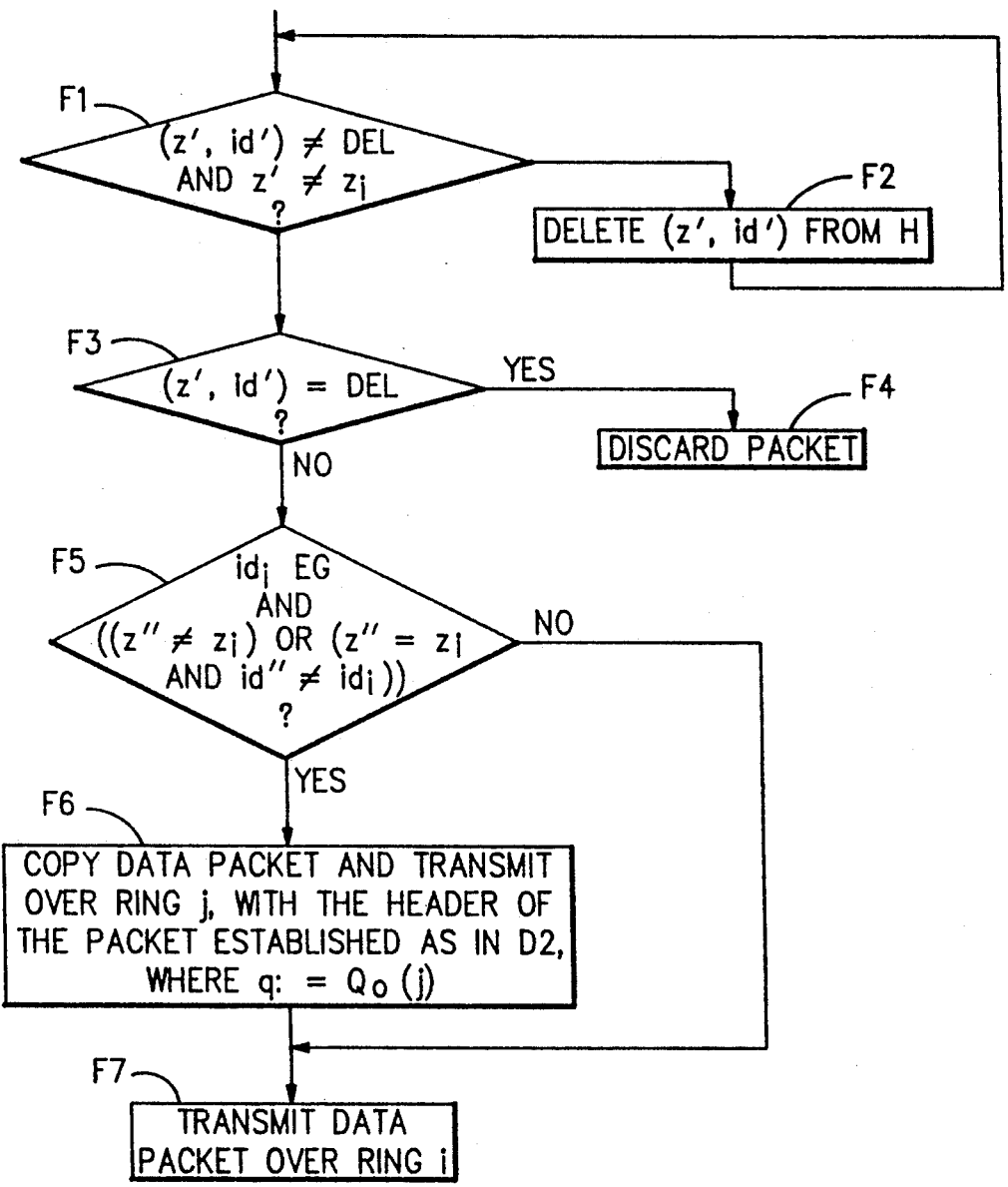
FIG. 9 is a flow chart showing an algorithm employed by a bridge node after receiving a data packet having a header established according to the flow chart of FIG. 7.

FIG. 9 is a flow chart showing an algorithm employed by a bridge node $(i,j)$ after receiving a data packet. At step F1, the front address subfield in the header is checked, first, to determine if it is the delimiter DEL, and second, to determine if the subspace bit in that subfield is equal to the subspace bit of the bridge node in ring i. If neither of these conditions is true, the algorithm proceeds to step F2, where the front address subfield is deleted from the header. Steps F1 and F2 are repeated until one of the conditions tested in step F1 is true, and when this happens, the algorithm moves to step F3. At this step, the current front address subfield is checked to determine if it includes the delimiter DEL. If it does, the data packet is discarded at step F4; however, if that subfield does not contain DEL, then the algorithm moves to step F5.

Step F5 is similar to step E5. A first condition tested at step F5 is whether the group address in the header is the address of the bridge node in ring i. A second condition tested at step F5 involves comparing the subspace bit and the address of the bridge node in ring i to the subspace bit and the address, respectively, in the second address subfield from the front of the address field in the header of the data packet. If these two subspace bits are not equal, or if they are equal but these two addresses are not equal, this second condition is considered to be true. If both of the conditions tested at step F5 are true, then the node copies the data packet at step F6 and transmits that copied data packet onto ring j, and the header of the data packet on ring j is established according to the above-mentioned step D2, with $z=Q_o(j)$. After step F6, or immediately after step F5 if one of the conditions tested therein is not true, the algorithm proceeds to step F7, which is to transmit the data packet over ring i.

The present invention may also be used with a global addressing method for group mode. This mode is used when the originating node does not have any information on the destination of a data packet or on the network topology; and, therefore, the packet should traverse all of the nodes in the ring or rings of the communication network. Typically, this node will be used only for global control, initialization of the network and setup.

Global addresses commonly have long formats, typically 48 or 64 bits long, and decoding these addresses can cause extensive delays. In order to avoid these delays, each node that receives a global data packet copies that packet and then, before decoding the data packet, forwards the packet onto the next node in the network. Eventually, the data packet is removed from the network by means of the DEL symbol.

with reference to FIG. 10, a data packet having a global address is identified by positioning a special, reserved symbol, GA, in the routing part of the header of the data packet; and the global address itself, GLB, is located in the header of the data packet after the DEL symbol. Hence, when a node identifies GA in the routing part of the header of a data packet, the node knows that a global address is located after the route delimiter in that header.

The control field of the packet header of a global data packet is the same, GR, as for a group data packet. A data packet in the global group mode is copied by all the nodes along its routing path after they identify GA in the address field of the data packet header; and it is only after the node decodes the global address in that header that the node determines either to keep the data packet or to discard it.

Thus, when a global data packet leaves its source node, $id_o$, the format of the header of the data packet is:

$$H=\{GR, (q, \phi), (q, GA), (q, GA), (q, GA,), (q, GA), (q, id_o), DEL, GLB\}$$

and after a global data packet is forwarded across a bridge node B(i,j) from ring i to ring j, the header of the data packet will have the following format:

$$H=\{GR, (q, \phi), (q, GA), (q, GA), (q, GA), (q, GA), (q, B(j,i), DEL, GLB\}$$

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

Having thus described our invention, what we claim as new, and desire to secure by Letters Patent is:

1. A method of discarding unwanted data packets from a communication network of the type having a multitude of nodes connected together to form a circular network, each node having an address, and each data packet including a plurality of address subfields to identify addresses of one or more of said nodes, the method comprising the steps of:
   dividing the network into a plurality of segments, each of the network segments being adjacent at least to another of the network segments, and wherein each of the nodes is in one of the segments and each of the segments includes at least one of the nodes;
   assigning each of the network segments one of a plurality of subspace values such that adjacent network segments have different subspace values;
   assigning to each address subfield one of the plurality of subspace values;
   transmitting each data packet over the communication network, including the steps of
   i) at each node, comparing the subspace value of the network segment in which the node is located, with the subspace value in one of the address subfields in the data packet,
   ii) if said compared values are not equal, discarding the said one address subfield, and
   iii) discarding the data packet after all of the address subfields therein have been discarded.

2. A method according to claim 1, wherein a delimiter is located in each data packet, and the step of discarding the data packet includes the steps of:
   after discarding each address subfield, checking the next subfield in the data packet, and
   i) if said next subfield does not include the delimiter, transmitting the data packet to another node of the network, and
   ii) if said next subfield includes the delimiter, discarding the data packet.

3. A method according to claim 2, wherein in each data packet, the address subfields in the data packet are arranged in a sequence, and the comparing step includes the step of, at each node, comparing the subspace value of the network segment in which the node is located, with the subspace value in the address subfield at the front of the sequence of address subfields.

4. A method according to claim 3, wherein the delimiter is located after the sequence of address subfields.

5. A method according to claim 4, wherein said plurality of subspace values consist of two subspace values.

6. A method according to claim 3, wherein the communication network includes at least first and second rings, and the multitude of nodes includes a bridge node connecting together said first and second rings, and wherein the transmitting step includes the step of:
   whenever one of the data packets is transmitted to the bridge node over the first ring, the bridge node checking to determine if the address of the bridge node is in one of the address subfields in the data packet; and
   if the address of the bridge node is in one of the address subfields in the data packet, the bridge node transmitting the data packet to the second ring.

7. A method according to claim 1, wherein the transmitting step further includes the step of:
   iv) if said compared values are equal, the node copying the data packet, discarding said one address subfield, and transmitting the data packet to another one of the nodes of the network.

8. A method according to claim 1, wherein the transmitting step further includes the step of:
   iv) if said compared values are equal, the node copying the data packet, and transmitting the data packet to another one of the nodes of the network without discarding said one address subfields.

9. A method for addressing data packets for routing over a communication network of the type having a multitude of nodes connected together, each node having a node address, the method comprising:
   separating the network into a plurality of segments, each of the segments being adjacent to at least one of the other of the segments and each of the segments including at least one of the nodes;
   assigning each of the segments one of a plurality of subspace values, such that adjacent segments have different subspace values; and a first of the nodes, providing the data packet with an address field to identify a route for the data packet between said first and second of the nodes, and including the steps of
   i) establishing a respective one associated subfield in the address field for each segment of the network in said route, said subfields being arranged in a sequence in said field, and each subfield including a subspace component and an address component,
   ii) alternating the subspace components of the subfields in said sequence between said plurality of subspace values, and
   iii) for the ring segment in said route that includes said second node, establishing the address of the second node as the address component of the subfield associated with the ring segment.

10. A method according to claim 9, wherein the providing step further includes the step of,
   iv) for each ring segment in said route that does not include said second node, establishing a given value that is unequal to the address of any node in the ring, as the address component of the subfield associated with the ring segment.

11. A method according to claim 10, wherein the providing step further includes the step of (v) setting the subspace component of the first address subfield in the address field equal to the subspace value of the ring segment in which the second node is located.

12. A method according to claim 11, wherein the providing step further includes the step of
   (vi) adding adelimiter to the address field immediately following one of the address subfields in the field, to identify said one of the subfields as the last subfield in the field.

13. A method according to claim 12, wherein the communication network includes at least first and second rings, and the multitude of nodes includes a bridge node connecting together said first and second rings, and further comprising the step of:
   for each data packet that is to be transmitted from the first ring to the second ring, establishing a respective one subfield in the address field of the data packet, and identifying in said one associated subfield the address of the bridge node.

14. A method according to claim 13, further including the step of:
   for each data packet that is to be transmitted from the first ring to the second ring, establishing a further address subfield immediately following the subfield containing the address of the bridge node, and using the subspace component of said additional subfield to indicate the direction in which the data packet is to be transmitted over the second ring.

* * * * *